United States Patent Office 3,415,854
Patented Dec. 10, 1968

3,415,854
ADAMANTOATE ESTERS OF 13β-ALKYLGON-4-EN-3-OLS
Joseph Tokolics, King of Prussia, Gordon A. Hughes, Haverford, Herschel Smith, Wayne, and Kurt W. Ledig, Philadelphia, Pa., assignors to American Home Products Corporation, New York, N.Y., a corporation of Delaware
No Drawings. Filed Oct. 12, 1966, Ser. No. 586,016
9 Claims. (Cl. 260—397.5)

This invention relates to and has for its objects the provision of new physiologically active compounds and novel processes for their production.

More particularly, this invention relates to the 3-adamantoate esters of 13β-alkylgon-4-en-3-ols. The preferred compounds being those having the Formula 1:

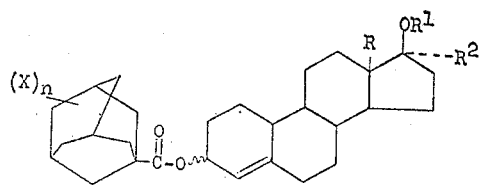

I wherein ($\xi$) represents the alpha or beta position; X is selected from the group consisting of hydrogen, lower alkyl, hydroxy, lower acyloxy, phenyl and halo; R is an alkyl group of less than five carbon atoms; $R^1$ is selected from the group consisting of hydrogen and acyl; $R^2$ is selected from the group consisting of lower alkyl, lower alkenyl, lower alkynyl, halogen substituted lower alkenyl, halogen substituted lower alkynyl, trifluoromethyl substituted lower alkenyl and trifluoromethyl substituted lower alkynyl; and $n$ is 1, 2 or 3.

Among the suitable acyloxys may be mentioned the acyloxy radical of a hydrocarbon carboxylic acid of less than twelve carbon atoms, as exemplified by the lower alkanoic acids (e.g., acetic, propionic, butyric, hexanoic and enanthic acid), the lower alkenoic acids (e.g., acrylic acid), the cycloalkane carboxylic acids (e.g., cyclobutane carboxylic acid), the monocyclic aromatic carboxylic acids (e.g., benzoic acid), and the monocyclic aryl lower alkanoic acids (e.g., phenacetic and β-phenylpropionic acid).

Among the suitable halogen substituted lower alkenyls may be mentioned perhalovinyls, such as trifluorovinyl, trichlorovinyl and 1,2-difluoro-2-chlorovinyl; the monohalovinyls such as 1-fluorovinyl, 2-fluorovinyl, 1-chlorovinyl and the like; 1-chloroallyl, 1-fluoroallyl, 1-chlorobutenyl, 1-fluorobutenyl and the like.

Among the suitable halogen substituted alkynyls may be mentioned fluoroethynyl, chloroethynyl, 1-fluoropropynyl, 1-chloropropynyl, 1-fluorobutynyl, 1-bromobutynyl and the like. Among the suitable trifluoromethyl substituted lower alkenyls may be mentioned 1-trifluoromethyl vinyl, 1-trifluoromethyl allyl, and the like. Among the suitable trifluoromethyl substituted lower alkynyls may be mentioned 1-trifluoromethylethynyl, 1-trifluoromethylpropynyl, and the like.

The alkyl groups mentioned included the straight chained and branched groups such as methyl, ethyl, propyl, isopropyl, butyl, isobutyl and the like.

The final products of this invention are physiologically active substances which possess long lasting progestational and anabolic activity. Hence, the compounds of this invention may be used in lieu of known progestational agents, in the treatment of habitual abortion or in lieu of testosterone propionate as an anabolic agent.

The compounds may be formulated for such administration, the concentration and/or dosage being based on the activity of the particular compound and the requirements of the patient.

To prepare the final products of this invention, compounds of the Formula II:

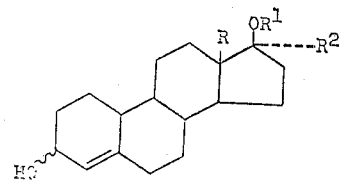

II wherein R, $R^1$ and $R^2$ are as hereinbefore defined, are reacted with the derivatives of an adamantane carboxylic acid, such as those of the formula III:

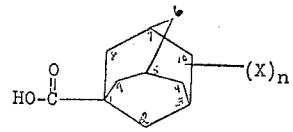

III wherein X and $n$ are as hereinbefore defined, under conventional acylating procedures, such as preparing the acid halide, preferably the acid chloride, or the acid anyhdride of the adamantane carboxylic acid compound as the acylating agent, and then reacting said acylating agent with the compound of Formula II in an organic solvent in the presence of a basic catalyst (e.g., pyridine).

The steroid starting materials are known compounds, described in Hughes and Smith, Belgium Patent No. 623,844, granted April 19, 1963, and British Patent No. 1,041,279, published September 1, 1966, and granted December 19, 1966. The following compounds, as suitable starting steroids, are described in the above-mentioned patents; 13,17-di lower alkylgon-4-en-3,17β-diol (e.g., 13,17-diethylgon-4-en-3β,17β-diol; 13-ethyl-17-propylgon-4-en-3α,17β-diol, 13 - isobutyl - 17 - ethylgon-4-en-3β,17β-diol); 13,17-di lower alkylgon-4-en-3,17β-diol, 17-acylate (e.g., 13,17-diethylgon-4-en-3β,17β-diol, 17-acetate); 13-lower alkynylgon-4-en-3,17β-diol (e.g., 13-ethyl-17-ethyethyl-17-vinylgon-4-en-3β,17β-diol); 13-lower alkyl-17-lower alkynylgon-4-en-3,17β-diol (e.g., 13-ethyl-17-enthynylgon-4-en-3β,17β-diol, 13-methyl-17-(2'-propynyl)-gon-4-en-3β,17β-diol); 17-haloethynyl-13-lower alkylgon-4-en-3,17β-diol (e.g., 17-chloroethynyl - 13 - ethylgon-4-en-3β,17β-diol, 17-fluoroethynyl-13-ethylgon-4-en-3β,17β - diol, 17-chloroethynyl-13-propylgon - 4 - en - 3β,17β-diol, 17α-chloroethynyl-13β-methylgon-4-en-3β,17β-diol); 17-trifluoromethylethynyl-13-lower alkylgon-4-en-3,17 - diol (e.g., 17-trifluoromethylethynyl-13β-methylgon - 4 - en-3,17β-diol, 17 - trifluoromethylethylnyl-13β-ethylgon-4-en-3,17β-diol); 17-chlorovinyl-13-ethylgon-4-en-3,17β-diol, and the like.

The substituted and unsubstituted adamantane carboxylic acid compounds that are useful as starting materials are commercially available or can be prepared according to any of the processes disclosed by R. C. Fort, Jr., et al. in Chemical Review, 64, 1964, pp. 277–300, include adamantane carboxylic acid; 3,5-di(lower alkyl) adamantane carboxylic acid (e.g., 3,5-dimethyladamantane-1-carboxylic acid); lower alkyl adamantane carboxylic acid (e.g., 3-methyladamantane-1-carboxylic acid); halogen substituted adamantane carboxylic acid (e.g., 7-chloroadamantane-1-carboxylic acid, 3-fluoroadamantane-1-carboxylic acid, 1 - bromoadamantane - 3 - carboxylic acid); 3-hydroxyadamantane-1-carboxylic acid; 3-phenyladamantane-1-carboxylic acid; 3-phenyl-5-bromoadamantane-1-carboxylic acid; 5-methyl-3-hydroxyadamantane-1-carboxylic acid; 3,5-dihydroxyadamantane-1-carboxylic acid; 3-acyloxyadamantane-1-carboxylic acid (e.g., 3-acetoxyadamantane-1-carboxylic acid); and the like.

The following examples illustrate the invention (all temperatures being in centigrade):

Example 1.—13β,17α-diethylgon-4-en-3β,17β-diol, 3-(adamantane-1-carboxylate)

3.0 gm. of adamantane-1-carboxylic acid is dissolved in 6.0 ml. of thionyl chloride and refluxed for 30 minutes. After the excess thionyl chloride is removed 1.6 gm. of 13,17-diethylgon-4-en-3β,17β-diol in 7.0 ml. of benzene and 1.0 ml. of pyridine is added to the reaction mixture. The mixture is left standing at room temperature overnight. 2.0 ml. of water is added and the mixture is stirred for 5 minutes, taken up in 85 ml. of ether. The ethereal solution is washed with 5% hydrochloric acid, saturated sodium bicarbonate, with water until neutral, dried over sodium sulfate, and filtered. The solvent is removed by evaporation in vacuo and the residue is crystallized from acetone to yield 0.5 g. of 13β,17α-diethyl-gon-4-en-3β,17β-diol, 3-(adamantane - 1 - carboxylate), having a melting point of 196–199°.

Analysis.—Calcd. for $C_{32}H_{48}O_3$: C, 79.95; H, 10.07. Found: C, 80.09; H, 9.36.

Similarly, following the procedure of Example 1, but substituting adamantane-2-carboxylic acid for adamantane-1-carboxylic acid, there is obtained 13β,17α-diethyl-gon-4-en-3β,17β-diol, 3-(2-adamantane carboxylate).

Example 2.—13β,17α-diethylgon-4-en-3β,17β-diol, 3-(3,5-dimethyladamantane-1-carboxylate)

Following the procedure of Example 1, but substituting 3,5-dimethyladamantane-1-carboxylic acid for adamantane carboxylic acid there is obtained 13β,17α-diethylgon-4-en-3β,17β-diol, 3-(3,5-dimethyladamantane-1 - carboxylate).

Example 3.—13β,17α-diethylgon-4-en-3β,17β-diol, 3-(7-chloroadamantane-1-carboxylate)

Following the procedure of Example 1, but substituting 7-chloroadamantane-1-carboxylic acid for adamantane carboxylic acid, there is obtained 13β,17α-diethylgon-4-en-3β,17β-diol, 3-(7-chloroadamantane-1-carboxylate).

Example 4.—13β-isobutyl-17α-ethylgon-4-en-3β,17β-diol, 3-(adamantane-1-carboxylate)

Following the procedure of Example 1, but substituting 13β-isobutyl-17α-ethylgon-4-en-3β,17β-diol for 13β,17α-diethylgon-4-en-3β,17β-diol, there is obtained 13β-isobutyl-17α-ethylgon-4-en-3β,17β-diol, 3-(adamantane - 1 - carboxylate).

Example 5.—13β,17α-diethylgon-4-en-3β,17β-diol, 3-(adamantane-1-carboxylate), 17-acetate Following the procedure of Example 1, but substituting 13β,17α-diethylgon-4-en-3β,17β-diol, 17-acetate for 13β,17α-diethylgon-4-en-3β,17β-diol, there is obtained 13β,17α-diethylgon-4-en-3β,17β-diol, 3-(adamantane - 1 - carboxylate), 17-acetate.

Example 6.—13β-ethyl-17α-ethynylgon-4-en-3β,17β - diol, 3-(adamantane-1-carboxylate)

3.0 gm. of adamantane carboxylic acid is dissolved in 6.0 ml. of thionyl chloride and refluxed for 30 minutes. After the excess thionyl chloride is removed, 1.6 gm. of 13β-ethyl-17α-ethynylgon-4-en-3β,17β-diol in 7.0 ml. of benzene and 1.0 ml. of pyridine is added to the reaction mixture. The mixture is permitted to stand at room temperature overnight. 2.0 ml. of water is added and the mixture is stirred for 5 minutes. The mixture is taken up in 85 ml. of ether and the ethereal solution is washed with 5% hydrochloric acid, saturated sodium bicarbonate solution and water until neutral, dried over sodium sulfate and then filtered. The solvent is removed by evaporation in vacuo and the residue is dissolved in benzene and filtered through 20 g. of neutral alumina. The combined fractions were crystallized from acetone, containing 1 mole of acetone to yield 13β-ethyl-17α-ethynylgon-4-en-3β,17β-diol, 3-(adamantane - 1 - carboxylate), having a melting point of 159–161°.

Analysis.—Calcd. for $C_{32}H_{44}O_3 \cdot CH_3—CO—CH_3$: C, 78.61; H, 9.42. Found: C, 78.61; H, 9.44.

Example 7.—13β-ethyl-17α-ethynylgon-4-en-3β,17β - diol, 3-(5-methyl-3-hydroxyadamantane-1-carboxylate)

Following the procedure of Example 6, but substituting 5-methyl 3-hydroxyadamantane-1-carboxylic acid for adamantane carboxylic acid, there is obtained 13β-ethyl-17α-ethynylgon-4-en-3β,17β-diol, 3-(5-methyl-3-hydroxyadamantane-1-carboxylate).

Example 8.—13β-ethyl-17α-ethynylgon-4-en-3β,17β - diol, 3-(3-phenyladamantane-1-carboxylate)

Following the procedure of Example 6, but substituting 3-phenyladamantane-1-carboxylic acid for adamantane-1-carboxylic acid, there is obtained 13β-ethyl-17α-ethynyl-gon-4-en-3β,17β-diol, 3-(3-phenyladamantane-1-carboxylate).

Example 9.—13α-methyl-17α-(2′-propynyl)-gon-4-en-3β,17β-diol, 3-(adamantane-1-carboxylate)

Following the procedure of Example 6, but substituting 13α-methyl-17α-(2′-propynyl)-gon-4-en-3β,17β - diol for 13β-ethyl-17α-ethynylgon-4-en-3β,17β-diol, there is obtained 13α-methyl-17α-(2′-propynyl)-gon-4 - en - 3β,17β-diol, 3-(adamantane-1-carboxylate).

Example 10.—13β-ethyl-17α-vinylgon-4-en-3β,17β - diol, 3-(adamantane-2-carboxylate)

3.0 gm. of adamantane-2-carboxylic acid is dissolved in 6.0 ml. of thionyl chloride and refluxed for 30 minutes. After the excess thionyl chloride is removed, 1.6 gm. of 13β-ethyl-17α-vinylgon-4-en-3β,17β-diol in 7.0 ml. of benzene and 1.0 ml. of pyridine is added to the reaction mixture. The mixture is permitted to stand at room temperature overnight. 2.0 ml. of water is added and the mixture is stirred for 5 minutes. The mixture is then taken up in ether and the organic phase is washed with 5% hydrochloric acid, saturated sodium bicarbonate solution and then with water until neutral, dried over sodium sulfate and then filtered. The solvent is removed by evaporation in vacuo and the residue is crystallized with acetone to yield 13β-ethyl-17α-vinylgon-4-en-3β,17β-diol, 3-(adamantane-2-carboxylate).

Example 11.—17α-chloroethynyl-13β-ethylgon-4-en-3β, 17β-diol, 3-(adamantane-1-carboxylate)

A suspension of 8.5 g. of adamantane-1-carboxylic acid and 13 ml. of thionyl chloride is refluxed for 30 minutes. The excess thionyl chloride is removed and the residue is treated 3 times in succession with 50 ml. of benezene and evaporated to dryness to obtain a crystalline material. The latter is mixed with a solution of 30 ml. of benzene, 2.6 ml. of pyridine, and 4.3 g. of 17α-chloroethynyl-13β-ethylgon-4-en-3β,17β-diol and the reaction mixture is kept for 3 days at room temperature. After the addition of water, the organic layer is separated and extracted with 1 N hydrochloric acid followed by saturated sodium bicarbonate solution. The solvent is removed by evaporation in vacuo and the residue is crystallized from acetone to yield 1.6 g. of 17α-chloroethynyl-13β-ethylgon-4-en-3β,17β-diol, 3-(adamantane-1-carboxylate), having a melting point of 175–176°.

Analysis.—Calcd. for $C_{32}H_{43}O_3Cl$: C, 75.19; H, 8.48; Cl, 6.94%. Found: C, 74.85; H, 9.05; Cl, 7.0.

Example 12.—17α-chloroethynyl-13β-ethylgon-4-en-3β, 17β-diol,3-(3-hydroxyadamantane-1-carboxylate)

Following the procedure of Example 11, but substituting 3-hydroxyadamantane-1-carboxylic acid for adamantane-1-carboxylic acid, there is obtained 17α-chloroethynyl-13β-ethylgon-4-en-3β,17β-diol, 3-(3 - hydroxyadamantane-1-carboxylate).

Example 13.—17α-chloroethynyl-13β-ethylgon-4-en-3β, 17β-diol, 3-(7-chloroadamantane-1-carboxylate)

Following the procedure of Example 11, but substituting 7-chloroadamantane-1-carboxylic acid for adamantane-1-carboxylic acid there is obtained 17α-chloroethynyl-13β-ethylgon - 4 - en-3β,17β-diol, 3-(7-chloroadamantane-1-carboxylate).

Example 14.—17α-fluoroethynyl-13β-ethylgon-4-en-3β, 17β-diol, 3-(adamantane-1-carboxylate)

Following the procedure of Example 11, but substituting 17α-fluoroethynyl-13β-ethylgon-4-en-3β,17β-diol for 17α-chloroethynyl-13β-ethylgon-4-en-3β,17β-diol there is obtained 17α-fluoroethynyl-13β-ethylgon - 4 - en-3β,17β-diol, 3-(adamantane-1-carboxylate).

Example 15.—17α-chloroethynyl-13β-propylgon-4-en-3β, 17β-diol, 3-(adamantane-1-carboxylate)

Following the procedure of Example 11, but substituting 17α-chloroethynyl-13β-propylgon-4-en-3β,17β-diol for 17α-chloroethynyl-13β-ethylgon-4-en-3β,17β-diol, there is obtained 17α-chloroethynyl-13β-propylgon-4-en-3β,17β-diol, 3-(adamantane-1-carboxylate).

Example 16.—17α-chloroethynyl-13β-methylgon-4-en-3β, 17β-diol, 3-(adamantane-1-carboxylate)

Following the procedure of Example 11, but substituting 17α-chloroethynyl-13β-methylgon-4-en-3β,17β-diol for 17α-chloroethynyl-13β-ethylgon-4-en-3β,17β-diol there is obtained 17α-chloroethynyl-13β-methylgon-4-en - 3β,17β-diol, 3-(adamantane-1-carboxylate).

Example 17.—17α-trifluoromethylethynyl-13β-methylgon-4-en-3β,17β-diol, 3-(adamantane-1-carboxylate)

Following the procedure of Example 11, but substituting 17α-trifluoromethylethynyl-13β-methylgon-4-en - 3β, 17β-diol for 17α-chloroethynyl-13β-ethylgon-4-en-3β,17β-diol there is obtained 17α - trifluoromethylethynyl - 13β-methylgon-4-en-3β,17β-diol, 3 - (adamantane-1-carboxylate).

Example 18.—17α-trifluoromethylethynyl-13β-ethylgon-4-en-3β,17β-diol, 3-(adamantane-1-carboxylate)

Following the procedure of Example 11, but substituting 17α-trifluoromethylethynyl-13β-ethylgon-4-en-3β,17β-diol for 17α-chloroethynyl-13β-ethylgon-4-en-3β,17β-diol there is obtained 17α - trifluoromethylethynyl-13β-ethylgon-4-en-3β,17β-diol, 3-(adamantane-1-carboxylate).

Example 19.—17α-chlorovinyl-13β-ethylgon-4-en-3β,17β-diol, 3-(adamantane-1-carboxylate)

Following the procedure of Example 11, but substituting 17α-chlorovinyl-13β-ethylgon-4-en-3β,17β-diol for 17α-chloroethynyl-13β-ethylgon-4-en-3β,17β-diol there is obtained 17α-chlorovinyl - 13β-ethylgon-4-3β,17β-diol, 3-(adamantane-1-carboxylate).

Example 20.—17α-chloroethynyl-13β-ethylgon-4-en - 3β, 17β-diol, 3-(5-methyl-3-hydroxyadamantane-1-carboxylate)

Following the procedure of Example 11, but substituting 5-methyl-3-hydroxyadamantane-1-carboxylic acid for adamantane-1-carboxylic acid, there is obtained 17α-chloroethynyl-13β-ethylgon-4-en-3β,17β-diol, 3 - (5 - methyl-3-hydroxyadamantane-1-carboxylate).

It is understood that either the dl-steroids or specific d- or l-isomers may be employed as starting material with like results.

The invention may be variously otherwise embodied within the scope of the appended claims.

What is claimed is:

1. The 3-adamantoate esters of 13β-alkylgon-4-en-3-ols.

2. A compound according to claim 1 having the formula:

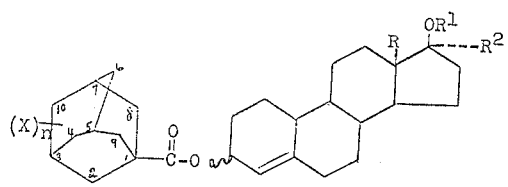

wherein X represents a substituent in the 1, 3, 5, or 7 positions of the adamantane ring which is selected from the group consisting of hydrogen, lower alkyl, hydroxy, lower acyloxy, phenyl and halo; R is an alkyl group of less than 5 carbon atoms; $R^1$ is selected from the group consisting of hydrogen and acyl; $R^2$ is selected from the group consisting of lower alkyl, lower alkenyl, lower alkynyl, halo substituted lower alkenyl, halo substituted lower alkylnyl, trifluoromethyl substituted lower alkenyl and trifluoromethyl susbtituted lower alkynyl; and $n$ is an integer less than 4.

3. A compound according to claim 1 having the formula:

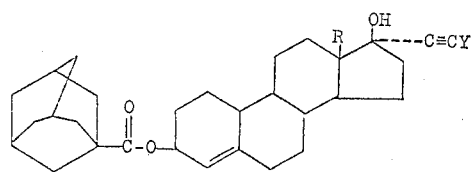

wherein Y is selected from the group consisting of hydrogen and halo; and R is as hereinbefore defined.

4. A compound according to claim 1 which is 13β,17α-di(lower alkyl)-gon-4-en-3,17β-diol, 3-(adamantane carboxylate).

5. The compound of claim 4 which is 13β,17α-diethylgon-4-en-3β,17β-diol, 3-(adamantane carboxylate).

6. A compound according to claim 1 which is 13β-lower alkyl-17α-lower alkynylgon-4-en-3,17β-diol, 3-(adamantane carboxylate).

7. The compound of claim 6 which is 13β-ethyl-17α-ethynylgon-4-en-3β,17β-diol, 3-(1-adamantane carboxylate).

8. A compound according to claim 1 which is 17α-halo lower alkynyl-13β-lower alkylgon-4-en-3,17β-diol, 3-(adamantane carboxylate).

9. The compound of claim 8 which is 17α-chloroethynyl-13β-ethylgon-4-en-3β,17β-diol, 3-(1-adamantane carboxylate).

References Cited

UNITED STATES PATENTS 3,280,158 10/1966 Edwards _____ 260—397.5
3,338,925 8/1967 Fried _____ 260—397.4

OTHER REFERENCES

Rapala et al., Journ. Med. Chem., September 165, pp. 580–583.

ELBERT L. ROBERTS, *Primary Examiner.*

U.S. Cl. X.R.

167—74

UNITED STATES PATENT OFFICE
CERTIFICATE OF CORRECTION

Patent No. 3,415,854                          December 10, 1968

Joseph Tokolics et al.

It is certified that error appears in the above identified patent and that said Letters Patent are hereby corrected as shown below:

Column 2, lines 42 and 43, "13-lower alkynylgon-4-en-3,17 - diol" should read -- 13-lower alkyl-17-lower alkenylgon-4-en-3,17 - diol --; lines 43 and 44, cancel " 17-ethyethyl- --; lines 45 and 46, "enthynylgon" should read -- ethynylgon --; line 54, "-trifluoromethylethylnyl-" should read -- -trifluoromethylethynyl- --.

Signed and sealed this 17th day of March 1970.

(SEAL)
Attest:

Edward M. Fletcher, Jr.                      WILLIAM E. SCHUYLER, JR.

Attesting Officer                                Commissioner of Patents